Oct. 10, 1939.    F. H. FLEISCHER    2,175,887
LUBRICATING DEVICE
Filed July 27, 1937
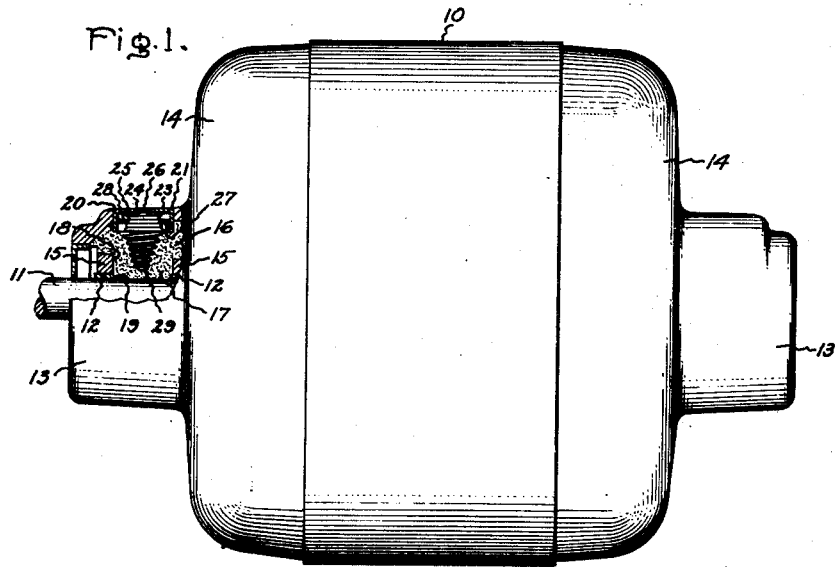
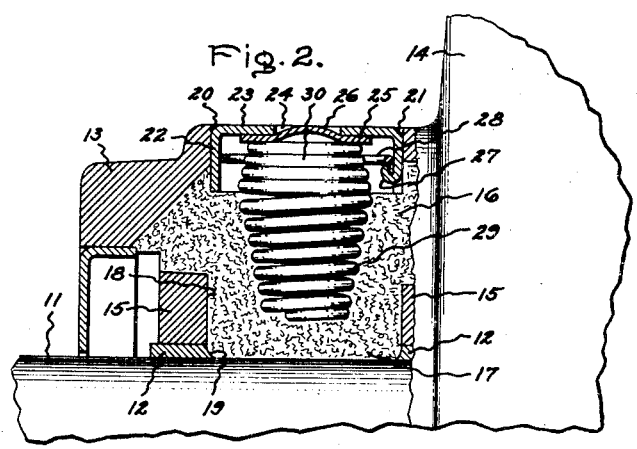
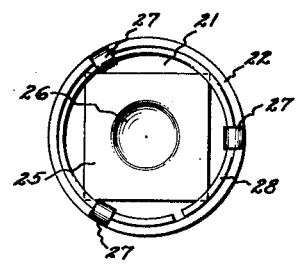
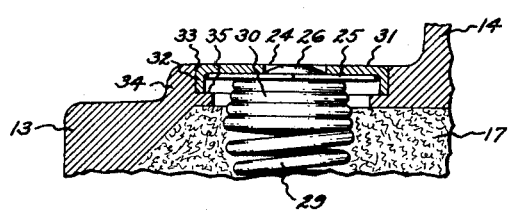
Inventor:
Frank H. Fleischer
by Harry E. Dunham
His Attorney.

Patented Oct. 10, 1939

2,175,887

UNITED STATES PATENT OFFICE 2,175,887

LUBRICATING DEVICE

Frank H. Fleischer, Fort Wayne, Ind., assignor to General Electric Company, a corporation of New York Application July 27, 1937, Serial No. 155,941

8 Claims. (Cl. 308—132)

My invention relates to lubricating devices, and more particularly to filler caps for such devices.

An object of my invention is to provide an improved and simplified bearing lubricating device utilizing a filler cap having a filling opening therein and a closure for the opening arranged in axially freely movable relation within the cap for all of its operating positions, and preferably biased toward closed position by a resilient spring also arranged to insure free axial movement thereof.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a dynamo-electric machine provided with a bearing housing partly in section embodying my invention; Fig. 2 is an enlarged fragmentary sectional view of the bearing housing shown in Fig. 1; Fig. 3 is a plan view of my improved filler cap shown in Figs. 1 and 2 as viewed from the open side of the filler cap; and Fig. 4 is a partial sectional view of another embodiment of my improved filler cap.

Referring to the drawing, I have shown in Fig. 1 a dynamo-electric machine having a stationary member 10 and a rotatable member mounted upon a shaft 11. The shaft 11 is supported by bearings 12 mounted in bearing housings 13 formed on end shields 14 which are secured to the stationary member 10. Each of the bearing housings 13 is formed with an inner axially extending bearing supporting wall 15 in which one of the bearings 12 is fitted. A chamber is formed between the supporting wall 15 and the housing 13 and provides a lubricant reservoir 16 which extends about the bearing 12. Absorbent material 17 is arranged within the lubricant reservoir 16 and extends about the supporting wall 15, and through an opening 18 in the supporting wall 15 and an opening 19 through the bearing 12 into contact with the surface of the shaft 11, and in this manner supplies lubricant thereto. In order to fill the lubricant reservoir an opening 20 is formed in the outer wall of the bearing housing 13, and communicates with the lubricant reservoir 16.

The opening 20 is closed by an inverted cup-shaped cap 21 having an open end and being press-fitted into the opening 20 to exclude dust and dirt from the reservoir and provide a closure for the opening. The cup-shaped cap 21 is provided with substantially cylindrical sides 22 and a substantially flat top 23, in the center of which is formed a lubricant supply opening 24. A substantially rectangular closure plate 25 is loosely fitted for axial movement within the cap 21 and is provided with a curved portion 26 arranged to close the lubricant supply opening 24. The corners of the rectangular closure plate 25 slidably engage the inner side of the cylindrical portion 22 of the cap and are arranged to guide the closure plate in an axially slidable relation within the cap 21. In order to retain the closure plate 25 in position within the cap 21, I provide three inwardly extending projections or stops 27 which are punched and bent inwardly from the cylindrical portion 22 of the cup-shaped cap 21 adjacent the open end of said cap. A split annular spring 28 is arranged within the cap 21 in engagement with the inner side of the annular portion 22 and is supported upon the upturned ends of the projections 27 between these projections and the plate 25 and extends inwardly beyond the corners of the plate, and thereby provides a stop beyond which the plate 25 cannot travel.

In assembling the cap, the closure plate 25 is loosely fitted into a position within the cap 21 between the projections 27, and the split annular spring 28 is pressed to a diameter smaller than the diameter of the inside of the cap and inserted within the cap between the projections 27 to a position between the ends of these projections and the plate 25. The spring 28 is then released and expands into engagement with the inside of the cylindrical portion 22 of the cap and is retained therein by the projections 27.

Thus, it is seen that my improved cap is simple to construct and assemble, and since there are no irregularities or obstructions within the cylindrical portion of the cap between the top 23 and the annular spring 28, the closure plate 25 is insured of free axial movement.

In order to bias the closure plate 25 into a position to close the opening 24 in the top 23 of the cap, a resilient coil spring 29 is arranged within the bearing housing. One end of the spring 29 is in engagement with the inside of the closure plate 25, and the other end engages the absorbent material 17, so as to press this material through the openings 18 and 19 into contact with the surface of the shaft 11. In this manner, this coil spring 29 is compressed between the absorbent material 17 and the closure plate 25 and exerts a biasing force in both directions as desired. In order to prevent the engagement of the upper turns of the coil spring 29 with the annular spring 28 or the projections 27, the upper turns 30 of the coil spring 29 adjacent the closure plate 25 are arranged in closely adjacent relation, so that there is substantially no space between adjacent turns, for a distance from the upper end of the spring which is greater than the distance from the under surface of the closure plate 25 when the plate is in its normally engaged position on the under side of the top 23 to the lowest point of the projections 27. In this manner, I provide a simple oil filler cap construction provided with a lubricant supply opening closure plate which is guided within the oil cap in an axially freely movable relation therein, and is biased into closed relation thereto in such a manner as to prevent engagement of the plate or biasing element with any obstruction which might tend to prevent the proper operation thereof.

In Fig. 4, I have shown another embodiment of my invention wherein the lubricating device includes an inverted cup-shaped oil cap 31 having an open end and a substantially cylindrical portion 32 press-fitted within an opening 33 formed in a shoulder 34 in a hollow bearing housing 13, similar to that shown in Figs. 1 and 2. The opening 33 is provided with an annular radially extending flange 35 which is arranged to support the edge of the cup-shaped cap 31 at its open end. As in the arrangement shown in Figs. 1 and 2, the cup-shaped cap 31 is provided with a lubricant supply opening 24 and a substantially rectangular closure plate 25 having a curved portion 26 arranged to close the lubricant supply opening 24. The corners of the rectangular plate 25 act as guides for the plate within the cylindrical portion of the cap 31, and the flange 35 on the bearing housing 13 provides an inwardly extending stop which limits the axial movement of the closure plate 25 to axially freely movable positions within the cap. As in Fig. 1, a resilient coil spring 29 is arranged to bias the closure plate 25 into engagement with the inner surface of the top of the cap 31, and a plurality of turns 30 adjacent the closure plate 25 are arranged in closely spaced relation, similar to the spring construction shown in Figs. 1 and 2, for a distance greater than the distance from the inner surface of the closure plate 25 in engagement with the top of the oil cap 31 to the under surface of the inwardly extending flanges 35. In this manner, I provide a simple oil cap lubricating device wherein I insure against engagement of the closure plate and biasing spring with irregularities or projections within the device which might tend to obstruct the proper operation thereof.

While I have illustrated particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A lubricating device including a cup-shaped filler cap having an open end, an opening formed in the top of said cap, a plate loosely fitted within said cap for movement axially thereof and having a curved portion arranged to close said cap top opening, a plurality of projections extending inwardly from the sides of said cap adjacent the open end thereof, and an annular spring arranged within said cap and retained therein by said projections to limit the axial movement of said plate to axially freely movable positions with said cap.

2. A lubricating device including a cup-shaped filler cap, an opening formed in the top of said cap, a plate loosely fitted within said cap for movement axially thereof and arranged to close said cap top opening, said plate being guided in axially slidable relation within said cap, means for limiting the axial movement of said plate to axially freely movable positions within said cap, and means including a coil spring for biasing said plate into engagement with said cap top to close said cap top opening, a plurality of turns of said coil spring adjacent said plate being arranged in closely adjacent engaging relation for a distance greater than the distance from said plate movement limiting means to the under surface of said plate when said plate is in engagement with the inner side of said cap top.

3. A bearing housing having a lubricant reservoir, a bearing supported in said housing, absorbent material in said lubricant reservoir arranged to feed lubricant to said bearing, a lubricant supply opening in said housing communicating with said reservoir, a cup-shaped filler cap secured in said lubricant supply opening, an opening formed in the top of said cap, a plate loosely fitted within said cap for movement axially thereof and arranged to close said opening in said cap top, resilient means for urging said plate into engagement with said cap top to close said cap top opening, and means for limiting the axial movement of said plate to axially freely movable positions thereof.

4. A bearing housing having a lubricant reservoir, a bearing supported in said housing, absorbent material in said lubricant reservoir arranged to feed lubricant to said bearing, a lubricant supply opening in said housing communicating with said reservoir, a cup-shaped filler cap secured in said lubricant supply opening, an opening formed in the top of said cap, a plate loosely fitted within said cap for movement axially thereof and arranged to close said opening in said cap top, said plate being guided in axially slidable relation within said cap, resilient means for urging said plate into engagement with said cap top to close said cap top opening and for pressing said absorbent material toward said bearing, and means for limiting the axial movement of said plate to axially freely movable positions thereof.

5. A bearing housing having a lubricant reservoir, a bearing supported in said housing, absorbent material in said lubricant reservoir arranged to feed lubricant to said bearing, a lubricant supply opening in said housing communicating with said reservoir, a cup-shaped filler cap secured in said lubricant supply opening, an opening formed in the top of said cap, a plate loosely fitted within said cap for movement axially thereof and arranged to close said opening in said cap top, said plate being arranged to be guided axially in slidable relation with the inner side of said cap, resilient means for biasing said plate into engagement with said cap top to close said cap top opening, and means including a stop formed on said cap for limiting the axial movement of said plate to axially freely movable positions thereof.

6. A bearing housing having a lubricant reservoir, a bearing supported in said housing, absorbent material in said lubricant reservoir arranged to feed lubricant to said bearing, a lubricant supply opening in said housing communicating with said reservoir, a cup-shaped filler cap secured in said lubricant supply opening, an opening formed in the top of said cap, a plate loosely fitted within said cap for movement axially thereof and arranged to close said opening in said cap top, resilient means for biasing said plate into engagement with said cap top to close said cap top opening, a plurality of inwardly extending projections formed on said cap, and an annular spring element secured within said cap between said projections and said plate arranged to limit the axial movement of said plate to axially freely movable positions thereof.

7. A bearing housing having a lubricant reservoir, a bearing supported in said housing, absorbent material in said lubricant reservoir arranged to feed lubricant to said bearing, a lubricant supply opening in said housing communicating with said reservoir, a cup-shaped filler cap having a substantially flat top and substantially cylindrical sides fitted in said lubricant supply opening, an opening formed centrally of said cap top, a plate fitted within said cylindrical sides of said cap slidable axially thereof and arranged to close said central opening in said cap top, resilient means for urging said plate into engagement with said cap top opening and for pressing said absorbent material toward said bearing, and means for limiting the axial movement of said plate to axially freely movable positions thereof.

8. A bearing housing having a lubricant reservoir, a bearing supported in said housing, absorbent material in said lubricant reservoir arranged to feed lubricant to said bearing, a lubricant supply opening in said housing communicating with said reservoir, a cup-shaped cap secured in said lubricant supply opening, an opening formed in the top of said cap, a plate loosely fitted within said cap for movement axially thereof and arranged to close said opening in said cap top, means for limiting the axial movement of said plate to axially freely movable positions within said cap, and means including a coil spring for urging said plate into engagement with said cap top to close said cap top opening, a plurality of turns of said coil spring adjacent said plate being arranged in closely adjacent engaging relation for a distance greater than the distance from said plate movement limiting means to the under surface of said plate when said plate is in engaged position with said cap top.

FRANK H. FLEISCHER.